May 26, 1942.     W. W. BOES ET AL     2,284,509
TORQUE AMPLIFIER
Filed Dec. 14, 1940
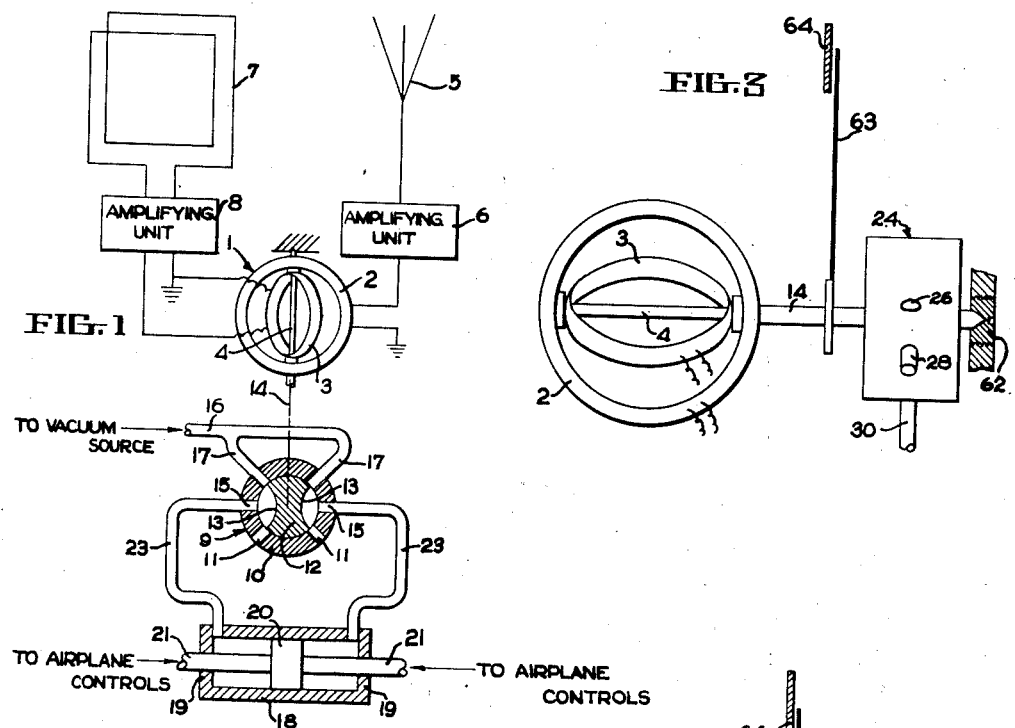
INVENTORS
WALTER W. BOES
J. ROY McGUIRE
By
ATTORNEYS Patented May 26, 1942

2,284,509

UNITED STATES PATENT OFFICE 2,284,509

TORQUE AMPLIFIER

Walter W. Boes and John Roy McGuire,
Dayton, Ohio

Application December 14, 1940, Serial No. 370,178

12 Claims. (Cl. 250—2)

The present invention relates to mechanical relays or torque amplifiers and particularly for increasing the torque of a moving pointer of an indicating instrument.

For many years there has been a constant problem existing in the instrument field and particularly in the electrical instrument filed, wherein it is desired to relay the action from a delicate instrument so that this action may perform other functions, such as closing switches. An outstanding example of this is the dynamometer type of electrical indicating instrument. In this instrument there is a fixed coil and a moving coil. One of the applications of this instrument is a so-called radio compass used in airplanes for instrument flying. This instrument indicates the direction of a radio broadcasting station with relation to the airplane.

The primary object of the invention is to provide a torque amplifier relay capable of being employed with ordinary indicating devices or instruments which respond to changes of electrical, mechanical or pneumatic energy to increase the power of the indicating instrument to a point sufficient to control external devices.

Another object is to provide a torque amplifier of inexpensive, compact and light weight construction which is particularly adapted to augment the power of the pointer movements of a sensitive indicator instrument.

Still other objects are: To provide an accessory which may be readily applied to an ordinary indicating instrument for relaying and amplifying the excursions of the instrument pointer; to provide a mechanical relay accessory for a directive compass which serves to translate the pointer movements into changes of pressure or other form of energy for control purposes.

The final object is to provide a combined pneumatic-mechanical relay accessory of compact and light weight character for an airplane dynamometer compass which serves through proper control to maintain or change the course of the plane in accordance with the indications of the compass.

Other objects and features will be apparent as the specification is perused in connection with the accompanying drawing in which:

Figure 1 shows particularly in diagram but with the improved valve in section, a system by which radio impulses received on a pair of antennae serve to control the operation of an airplane.

Figure 2 illustrates a convenient manner in which the improved torque amplifier may be adapted to any type of indicating instrument, typically illustrated as a dynamometer form of compass.

Figure 3 shows still another structure by which the improved torque amplifier or relay may be connected to the moving element of the instrument.

Referring to Figure 1, reference character 1 generally designates an electrical instrument of any suitable type having a stationary coil 2 and a movable coil 3 which is journaled at the shaft 4. The stationary coil 2 is connected to an antenna 5 preferably of the non-directive type and through an amplifying unit indicated at 6, of any suitable or well known type. The rotatable coil 3 is connected to a movable directive antenna 7, such as a loop, through an amplifying unit 8 similar to the unit 6. It is well known that when radio impulses are received by the non-directive antenna 5, an electromagnetic field is set up in the coil 2, the strength of this field depending on the power and the distance of the transmitting station but not on its direction.

On the other hand, when the radio waves are traveling in the plane of the coil 7, the maximum number of lines of the magnetic force are linked with the coil, but when the radio wave is traveling in a direction at right-angles to the plane of the coil, no lines of magnetic force are linked with the coil and no electromotive force is induced in the coil. In determining the direction of the transmitter source, the loop 7 is either manually or automatically rotated to a position such that the maximum electromotive force is generated in the coil 3. The difference in the electromagnetic fields set up by the coils 2 and 3 causes the coil 3 to rotate and since the coil 2 is fixed with respect to the body whose direction of travel is to be ascertained, the angle which the rotor makes with the stator of the compass will be a function of the angle between the direction of travel of the body and the direction of the transmitting source.

In certain types of so-called "automatic pilots," as when an airplane is running on a radio beam, it is desired that as soon as the radio compass detects a deviation from the direction of the radio beam certain controls such as the rudder be exercised to bring the ship on its proper course. Much difficulty has been encountered in the art in translating the movements of the rotatable coil into movements of sufficient torque to assure positive control of the directing elements of the plane. The use of light and heavy contacts attached to the pointer of the movable coil has been tried, also the use of light sensitive units, in which the movement of the pointer intercepts light beams during its travel. Still other expedients have been attempted such as causing the pointer to tune or detune radio frequency circuits as it moves with the rotating coil 3 but none of these expedients have been satisfactory for one reason or another due to the extreme difficulties encountered in airplane operation necessitating the utter simplicity of apparatus with its increased infallibility of operation together with the usual requirements as to light weight, compactness and inexpensiveness.

In accordance with the present invention there is provided an improved relay or torque amplifier which may be built either as an integral part of the compass or merely as an accessory for the compass and in both cases the device operates with great effectiveness.

In Figure 1, the improved torque amplifier is indicated generally at 9, and is constituted essentially of a metal cylinder 10 having a plurality of radially extending openings 11 communicating with the interior of a hollow cylinder. These openings serve as inlet and outlet ports for a fluid as will be explained presently. Within the cylinder there is a rotatable valve member having arcuate portions indicated at 13 formed therein, the distance between the tips of each arcuate portion being approximately the same distance across the solid portion of the cylinder as measured about the periphery.

The cylinder 12 is connected by a shaft indicated at 14, to the shaft 4 of the radio compass, the arrangement being such that as the coil 3 rotates the cylinder 12 will be given a similar rotation or oscillation. In addition to the openings 11 through the hollow cylinder 10, there is a pair of openings 15 diametrically positioned and occurring directly opposite the arcuate portions 13. A conduit 16 is connected to a source of vacuum as indicated, which might be the exhaust manifold of the aircraft engine. This conduit terminates in branch lines 17 which are fitted in the two upper openings 11 of the cylinder 10, thus causing the interior of the cylinder to be in communication with the vacuum source when the ends of the branch pipes are exposed by movement of the valve cylinder 12.

The other openings 11 at the bottom of the cylinder communicate with the atmosphere and at any suitable position with respect to the rotary valve 10 there is arranged a hollow cylinder 18 closed at both ends as indicated at 19, and containing a centrally positioned piston 20. The latter has extending from each side, a rod or shaft 21 which may be connected to the controls of the airplane as indicated. These rods extend through the closed ends of the cylinder. The conduits 23 are taken from each end of the cylinder 18 to the openings 15 in the cylinder 10 in order that the space at the arcuate portions 13 will be in communication with the interior of the cylinder on each side of the piston.

Assuming that the rotary member 12 has the position indicated in Figure 1, the spaces 13 at both sides of the cylinder 10 are in communication with the vacuum source and also the atmosphere so that any resulting pressure is admitted equally to both sides of the piston 20. The latter will therefore remain stationary. But supposing that the coil 3 is rotated due to a different strength of the radio signals being received at the antennae 5, 7, the rotary member 12 will be turned either clockwise or counter-clockwise depending on the movement of the coil 3. If the member 12 moves clockwise the lower left-hand opening 11 will be closed off and the interior of the cylinder 18 to the left of the piston will now be in communication with the vacuum source through the left-hand branch 17. Inasmuch as the right-hand branch 17 is obstructed by the valve 12, air under pressure is still present to the right of the piston 20 which will cause the latter to move to the left.

A rotation of the valve 12 in the counterclockwise direction due to corresponding movement of the coil 3 will similarly cause atmospheric pressure fluid to be admitted to the left of the piston 20 while the space to the right of the piston will be evacuated through the right-hand branch 17, causing the piston 20 to move to the right. Consequently the rotation of the valve 12 in either direction from its neutral position will cause the piston to move to the left or right, depending on the direction of rotation of the coil 3. It will be noted that inasmuch as the end boundaries of the spaces 13 normally intercept the conduits 17 and the openings 11 about midway, the element 12 need not be rotated very much in order to connect either of the conduits 15 to the vacuum source or to the fluid pressure source (atmosphere).

It is apparent that these excursions of the rod 21 may exercise in any suitable and well known manner, direct control of the horizontal and vertical movements of an airplane of which the system constitutes a part. The force with which the piston 20 moves in either direction may be very considerable depending on the pressure differential of the vacuum source and the atmosphere, or any difference of pressure exercised by other sources.

The valve elements 10, 12 may be made of hard wearing metal, carefully ground at the rotating surfaces to give very little friction so that only a relatively small power is required to rotate the member 12. Yet the movement of this member can readily control the reciprocation of the powerfully acting piston 20.

Instead of providing the pressure of the atmosphere as the actuating force, if desired, other fluids under pressure may be employed, compressible or non-compressible, such as gases and liquids, oil, etc. It is apparent that the valve mechanism including the piston device requires only four essential parts and by normally applying a vacuum source to give the necessary pressure differential which is normally present in aircraft engines, the cost of operating the valve is practically negligible. When this pressure differential is not too great, the cylinder 12 can be readily sealed at its periphery by mechanical fit, and thus readily rotatable by the small rotative effort exercised at the compass.

In Figure 2 I have shown the application of my improved torque amplifier as an accessory for an electrical indicating instrument typified by a dynamometer compass. The valve generally indicated at 24 is similar to that shown in Figure 1 and the rotatable valve member is mounted on a shaft indicated at 59. There is keyed to the shaft an angularly shaped arm 60 which terminates at the top in a bifurcated or forked member 61. The compass is similar to that shown in Figure 1 except that the shaft 14 is journaled at the bearing 62 and fixedly carries a pointer 63, the latter being adapted to move over the front face of a dial indicated at 64. The furcations of the lever portion 61 are spaced apart a distance sufficient snugly to embrace the sides of the pointer 63. Consequently after the movable coil rotates due to a difference in the magnetic field set up between the coils 2 and 3 as explained in connection with Figure 1, the pointer 63 will rotate with the shaft 14 and will cause a corresponding rotation of the movable valve 24. The opening 26 may be vented to the atmosphere and the conduits 28, 30 may be connected to the auxiliary apparatus, in order to obtain reciprocatory motion at the controlled device when the pointer 63 has moved away from its normal position to change the connections to the source of the pressure fluid. On the other hand the opening 26 may be connected to a vacuum source as in the case of Figure 1, and the conduit 30 vented to the atmosphere leaving the conduit 28 to apply pressure fluid to one side of a piston for actuating the controls of a moving body such as an airplane.

In Figure 3 I have shown still another arrangement in which the movements of an indicating device can be readily transmitted to the rotary portion of the torque amplifier. In this case the shaft 14 which extends from the movable coil element 3 and which carries the pointer 63 is extended to make a mechanical connection with the rotary portion of the valve 24. This structure involves a few less parts than that shown in Figure 2 in that the bifurcated member 60 can be eliminated and the bearing 62 serves as a journal for the shaft 14 and also for the rotatable valve member.

It is evident that in Figures 2 and 3 the pointer 63 will give a visual indication as to the position of the coil 3 and therefore of the direction of the moving body with respect to the source of received radio signals, the arrangement being such that a corrective control action is also instituted at the valve 24. It is further apparent that in view of the automatic control function of the valve 24, the visual indicating portion of the instrument shown in Figure 3 may not be necessary, in which case the pointer 63 could be removed. It is therefore possible in accordance with the present invention and by using the improved torque amplifier to remove from the panel of the airplane or other moving body, all of the indicating instruments which are employed for control purposes and have their functions performed through relay action without the attention or observation of the pilot.

While I have illustrated the actuation of the improved torque amplifier by a radio compass of the double coil type, it is apparent that other types of relays and indicating instruments could be employed to advantage such as the D'Arsonval, the magnetic vane type and the thermocouple type. Any relative movement as may be desired between the movements of the indicating instrument and of the valve may be obtained by gearing the pointer up or down, by means of the fork member 63 and a pinion (not shown).

It will be understood that we desire to comprehend within our invention such modifications as come within the scope of the claims and the invention.

Having thus fully described my invention, what I claim as new and desire to secure by Letters Patent, is:

1. In combination, a torque amplifier for indicating instruments comprising a movable element contained in a valve housing and adapted to control the movement of fluid energy as the element is moved, a source of mechanical energy to be indicated being connected directly to said element, said element being adapted to be mechanically connected to the movable member of an indicating instrument and the changes in said fluid energy being adapted to exercise control effects.

2. A control system comprising an electrical instrument for indicating the necessity for a change in the controls, and a pressure fluid valve actuated by said indicator through a direct mechanical connection, said valve comprising a ported housing containing a rotary element, a source of mechanical energy to be indicated by said instrument being connected directly to said rotary element, said element having a passageway so arranged that upon rotation of the valve element by said source of mechanical energy, pressure fluid is caused to flow through the housing in order to exercise control effects at positions external to the valve.

3. A control system comprising an electrical instrument containing member which moves when the instrument is energized, means for translating the movements of said member into corresponding changes in amplified form of mechanical energy for control purposes, said means comprising a cylindrical valve housing having a pair of openings to which high and low pressure fluid is respectively applied, also having a third opening which communicates with a controlled device, a rotatable element in said housing and connected directly to said member, said rotatable element having a passageway which brings the high and low pressure openings selectively in communication with the third opening through said passageway when the rotatable element is rotated, said rotatable element being mechanically connected to the movable element in said instrument whereby when said movable element is moved, the controlled device is controlled by the pressure fluid which passes through the valve housing and contained rotatable element.

4. A control system comprising an electrical indicating instrument having a movable member, a pressure fluid valve controlled by the movements of said member, said valve comprising a housing having at least three openings, one of which is adapted to receive high pressure fluid, another is vented to a low pressure reservoir and the third opening communicates with a device which is controlled by pressure fluid, a rotatable valve element in said housing and connected directly to said member, said rotatable valve element having a passageway which puts the third opening selectively in communication with the other openings when the valve element is rotated, and solely mechanical means for translating the movements of the element in the indicating instrument into rotational movements of the valve element whereby the indicating instrument controls the application of pressure fluid to said controlled device.

5. A control system comprising an electrical indicating instrument having a movable member, a pressure fluid valve controlled by the movements of said member, said valve comprising a housing having at least three openings, one of which is adapted to receive high pressure fluid, another is vented to a low pressure reservoir and the third opening communicates with a device which is controlled by pressure fluid, a rotatable valve element in said housing and being connected directly to said member, said valve element having a passageway which puts the third opening selectively into communication with the other openings when the valve element is rotated, and means for translating the movements of the member in the indicating instrument into rotational movements of the valve element whereby the indicating instrument controls the application of pressure fluid to said controlled device, said last mentioned means comprising a shaft connected between the movable element of said instrument and the rotatable valve element.

6. A control system comprising an electrical instrument having a pointer and responsive to changes in the electrical energy supplied to the instrument, means for translating the movements of the pointer into amplified changes of mechanical energy for control purposes, said means comprising a housing having a plurality of openings and containing a movable element, said element being connected directly to said pointer and having a passageway adapted to cause the openings of the housing selectively to communicate with one another through said passageway when the element is moved with respect to the housing, said element being mechanically connected to said pointer, and said openings being in communication with pressure control fluid.

7. A control system comprising an electrical indicating instrument provided with a movable pointer, a pressure fluid valve controlled by the movements of said pointer, said valve comprising a housing having at least three openings, one of which is adapted to receive high pressure fluid, another is vented to a low pressure reservoir and the third opening communicates with a controlled device, a rotatable valve element in said housing connected directly to said pointer and having a passageway which places the third opening selectively in communication with the other openings when the valve element is rotated, said valve element being mounted on a shaft which extends exteriorly of said housing, a bifurcated lever secured to said shaft, the furcations of which straddle the pointer of the indicating instrument.

8. A control system comprising an electromagnetic compass having stationary and rotatable coils, said coils being adapted to receive electrical currents of different magnitude which causes the coils to move with respect to one another, said movable coil being mounted on a shaft which extends to the exterior of the compass, a pressure fluid valve controlled by said compass, said valve comprising a housing having at least three openings one of which is adapted to receive relatively high pressure fluid, another opening is vented to a low pressure reservoir and the third opening communicates with a device to be actuated by the controlling valve, a rotatable valve element in said housing having a passageway which places the third opening selectively in communication with the other openings when the valve element is rotated, said valve element being mounted on the same shaft as said movable coil.

9. A control system comprising an electromagnetic compass having stationary and rotatable coils, said coils being adapted to receive electrical currents of different magnitude which causes the coils to move with respect to one another, said movable coil being mounted on a shaft which extends to the exterior of the compass, a pressure fluid valve controlled by said compass, said valve comprising a housing having at least three openings one of which is adapted to receive relatively high pressure fluid, another opening is vented to a low pressure reservoir and the third opening communicates with a device to be actuated by the controlling valve, a rotatable valve element in said housing having a passageway which places the third opening selectively in communication with the other openings when the valve element is rotated, said valve element being mounted on the same shaft as said movable coil, said device comprising a cylinder which contains a piston and a conduit extending from said cylinder to the third opening in said housing in order to cause movement of the piston when high pressure fluid is caused to flow through said conduit.

10. A control system comprising a compass having movable and stationary coils, said coils being adapted to receive currents of different amplitude whereby the coils are moved with respect to one another, said movable coil being mounted on a shaft which extends to the exterior of the compass, a pressure fluid valve solely mechanically controlled by said compass, said valve comprising a housing having at least six openings, two adjacent openings being connected in parallel to a vacuum source and two adjacent openings at the opposite side of said housing being vented to the atmosphere and the two intermediate openings oppositely disposed with respect to one another communicating with a device which is to be actuated by said valve, said housing containing a rotary valve element connected directly to said movable coil and having a passageway at each side which places said intermediate openings alternately and selectively into communication with the high and low pressure openings when the valve element is rotated, said device comprising a cylinder containing a double acting piston and conduits taken from opposite ends of the cylinder to said intermediate openings in the housing.

11. In an airplane control system comprising a compass having movable and stationary coils, said coils being adapted to receive currents of different amplitude whereby the coils are moved with respect to one another, said movable coil being mounted on a shaft which extends to the exterior of the compass, a pressure fluid valve solely mechanically controlled by said compass, said valve comprising a housing having at least six openings, two adjacent openings being connected in parallel to a vacuum source and two adjacent openings at the opposite side of said housing being vented to the atmosphere and the two intermediate housing oppositely disposed with respect to one another communicating with a device which is to be actuated by said valve, said housing containing a rotary valve element connected directly to said movable coil and having a passageway at each side which places said intermediate openings alternately and selectively into communication with the high and low pressure openings when the valve element is rotated, said device comprising a cylinder containing a double acting piston and conduits taken from opposite ends of the cylinder to said intermediate openings in the housing, said piston being spring biased from each end of the cylinder and being connected to airplane controls.

12. An airplane control system comprising an electromagnetic compass having stationary and movable coils, one of said coils being adapted to receive directional radiant energy and the other coil being adapted to receive non-directional radiant energy whereby the relative movement of the coils represents the difference in direction between the source of directive energy and the plane of the stationary coil, said movable coil being mounted on a shaft which is mechanically connected to a pressure fluid control valve for actuation purposes, said valve comprising a housing having at least three openings, and containing a rotatable valve element, one of said openings being connected to a source of pressure fluid, another of said openings being vented to a low pressure reservoir and the third opening communicating with a device which is to be actuated by the valve member, said rotatable valve element connected directly to said movable coil having a passageway which places the third opening selectively in communication with the other openings when the valve element is rotated in response to movement of said movable coil, said device comprising a piston-containing cylinder which has a conduit communicating with the interior of the cylinder on the working side of the piston and communicating with said third opening, said piston being mounted on a shaft which is mechanically connected to the airplane controls.

WALTER W. BOES.
J. ROY McGUIRE.